United States Patent
Dusterhoft et al.

(10) Patent No.: US 11,439,966 B2
(45) Date of Patent: Sep. 13, 2022

(54) HIGH PRESSURE STATIC MIXER

(71) Applicant: Halliburton Energy Services, Inc., Houston, TX (US)

(72) Inventors: Ronald Glen Dusterhoft, Katy, TX (US); Stanley Vernon Stephenson, Duncan, OK (US); Aaron M. Beuterbaugh, Spring, TX (US); Neil Alan Stegent, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/276,922

(22) PCT Filed: Nov. 19, 2018

(86) PCT No.: PCT/US2018/061811
§ 371 (c)(1),
(2) Date: Mar. 17, 2021

(87) PCT Pub. No.: WO2020/106269
PCT Pub. Date: May 28, 2020

(65) Prior Publication Data
US 2021/0370252 A1     Dec. 2, 2021

(51) Int. Cl.
*B01F 35/21*     (2022.01)
*E21B 43/26*     (2006.01)
(Continued)

(52) U.S. Cl.
CPC ........ *B01F 35/2134* (2022.01); *B01F 25/431* (2022.01); *B01F 25/4337* (2022.01);
(Continued)

(58) Field of Classification Search
CPC ............... B01F 25/431; B01F 25/4337; B01F 35/2134; B01F 35/2211; C09K 8/80; E21B 21/062; E21B 43/2607; E21B 43/26
See application file for complete search history.

(56) References Cited

U.S. PATENT DOCUMENTS 4,901,563 A     2/1990  Pearson
5,190,374 A *   3/1993  Harms .................... B01F 33/80
                                                            366/165.2
(Continued)

FOREIGN PATENT DOCUMENTS

CA          2670416          1/2017
WO         2017192151        11/2017

OTHER PUBLICATIONS

Halliburton Energy Service, Inc., CobraMax DM Service: A Low Risk and Efficient Operation Maximizing Stimulated Reservoir Volume in the Austin Chalk Location: East Texas, 2 pages, 2013.
(Continued)

*Primary Examiner* — James G Sayre
(74) *Attorney, Agent, or Firm* — Kilpatrick Townsend & Stockton LLP

(57) ABSTRACT

A system includes a high-pressure static mixer. The system also includes a clean fluid system that provides clean fluid to the first high-pressure static mixer at a first fluid velocity and a proppant fluid system that provides a proppant concentrate to the first high-pressure static mixer at a second fluid velocity. Additionally, the system includes a wellhead in fluid communication with the first high-pressure static mixer. The wellhead receives a mixed fluid including the clean fluid and the proppant concentrate from the first high-pressure static mixer.

20 Claims, 7 Drawing Sheets

(51) Int. Cl.
*C09K 8/80* (2006.01)
*E21B 21/06* (2006.01)
*B01F 25/431* (2022.01)
*B01F 25/433* (2022.01)
*B01F 35/221* (2022.01)

(52) U.S. Cl.
CPC ............ *B01F 35/2211* (2022.01); *C09K 8/80* (2013.01); *E21B 21/062* (2013.01); *E21B 43/2607* (2020.05)

(56) References Cited

U.S. PATENT DOCUMENTS

| | | |
|---|---|---|
| 6,132,079 A | 10/2000 | King |
| 6,467,949 B1 | 10/2002 | Reeder et al. |
| 8,813,836 B2 | 8/2014 | Kajaria et al. |
| 2009/0118866 A1 | 5/2009 | Dykstra et al. |
| 2011/0272156 A1* | 11/2011 | Johnson, Sr. ............ C09K 8/70 |
| | | 166/280.1 |
| 2013/0112419 A1* | 5/2013 | DeFosse ................. E21B 19/00 |
| | | 166/308.1 |
| 2014/0102706 A1 | 4/2014 | Fripp et al. |
| 2014/0352968 A1 | 12/2014 | Pitcher et al. |
| 2016/0047185 A1 | 2/2016 | Luharuka et al. |
| 2017/0370199 A1 | 12/2017 | Witkowski et al. |
| 2018/0209257 A1 | 7/2018 | Bobadilla Larios et al. |
| 2019/0071951 A1* | 3/2019 | Spencer ................. E21B 43/26 |

OTHER PUBLICATIONS

International Application No. PCT/US2018/061811, International Search Report and Written Opinion, dated Aug. 7, 2019, 13 pages.

* cited by examiner

HIGH PRESSURE STATIC MIXER

TECHNICAL FIELD

The present disclosure relates to a high-pressure static mixer used in hydrocarbon well stimulation. More specifically, this disclosure relates to a high pressure static mixer able to mix clean fluid and proppant concentrate at a location near a wellhead.

BACKGROUND

In stimulation techniques of hydrocarbon-producing wells, stimulation operations may involve pumping large amounts of stimulation fluid into a downhole environment. The stimulation fluid often includes abrasive materials (e.g., proppant in fracturing fluid) that can damage stimulation pumps, manifolds, and fluid lines when the stimulation fluids are pumped through the stimulation fluid lines at high velocities used in stimulation operations. For example, the stimulation fluid may be fracturing fluid that is blended remotely from a well. The remotely blended fracturing fluid is transported through fracturing fluid lines to a wellhead of the well. Because of the abrasive materials in the fracturing fluid, the length of travel, and the fluid velocity of the fracturing fluid, the fracturing pumps, manifolds, and fluid lines may experience significant wear during a hydraulic fracturing operation. Based on the wear experienced by the hydraulic fracturing pumps, manifolds, and fluid lines, excessive costs may be accumulated during the fracturing operations due to parts replacement and labor associated with the parts replacement.

Further, remote blending of the fracturing fluid provides challenges to efficiently changing a proppant concentration of the fracturing fluid entering the well. For example, an operator of a hydraulic fracturing operation may change an amount of proppant blended into the fracturing fluid, but the fracturing fluid lines must discharge any fracturing fluid already present in the pumps, manifolds, and fracturing fluid lines before the fracturing fluid with a different proppant concentration enters the well. Thus, a significant passage of time is observed before the corrected proppant concentration actually reaches the well.

DETAILED DESCRIPTION

Figure 1:
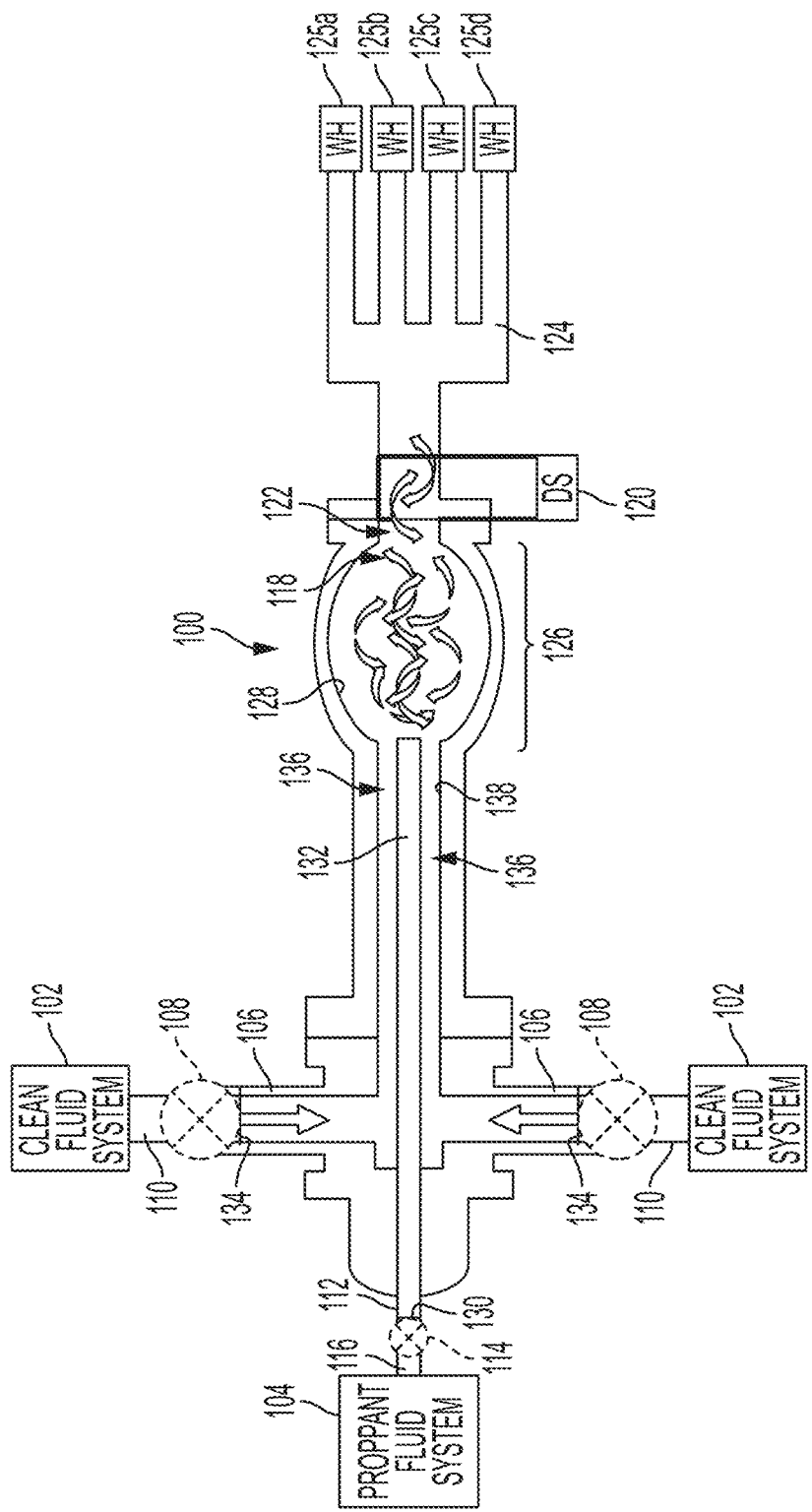
FIG. 1 is a cross-sectional view of an example of a high-pressure static mixer according to some aspects of the present disclosure.

Certain aspects and examples of the disclosure relate to high-pressure static mixers used to mix components of stimulation fluid prior to transmitting the stimulation fluid downhole within a wellbore. The high-pressure static mixers may receive clean fluid from a clean fluid system and stimulation concentrate (e.g., a proppant concentrate) from a stimulation fluid system, mix the clean fluid and the stimulation concentrate, and output a mixed fluid toward the wellbore. As used herein, the term "clean fluid" may refer to any fluid used in a wellbore stimulation operation that does not include abrasive material or that is substantially free of abrasive material. For example, the clean fluid may include water or water mixed with a surfactant, a friction reducer, any other non-abrasive materials, or any combination thereof.

The stimulation concentrate, which may include abrasive materials such as proppant, may be provided to the high-pressure static mixers at a low fluid velocity (i.e., a low fluid flow rate of between 10 and 20 bpm) relative to a fluid velocity (i.e., a flow rate of between 60 and 80 bpm) of the clean fluid. Because the stimulation concentrate moves through the stimulation fluid system at the low fluid velocity, wear in tubing of the stimulation fluid due to abrasive materials moving at high speeds is avoided. Further, the high-pressure static mixers may be located at or near wellheads associated with the high-pressure static mixers. By mixing the clean fluid with the stimulation concentrate at a location near the wellhead, the mixed fluid avoids transmission at a high fluid velocity over an extended distance. Thus, wear on stimulation tubing resulting from the mixed fluid travelling significant distances to the wellbore may be avoided.

Further, because the high-pressure static mixers are located relatively close to the wellbore, changes to the stimulation concentration (e.g., a proppant concentration) of the mixed fluid entering the wellbore may be made much quicker than if the mixed fluid is mixed further away from the wellbore. For example, flow rates of a clean fluid pump and a stimulation concentrate fluid pump may be adjusted, and the concentration of stimulation concentrate in the mixed fluid output by the high speed static mixer may change upon adjusting the flow rates. Thus, the closer the high speed static mixer is to the wellbore, the quicker the composition of the mixed fluid entering the wellbore changes.

Additionally, when providing the clean fluid and the stimulation concentrate to multiple wells simultaneously, or if positive displacement pumps are not being used, adjustable valves may be positioned along the clean fluid lines and the stimulation concentrate lines to control a flow of the clean fluid and the stimulation concentrate to the wells. The concentration of stimulation concentrate in the mixed fluid output by the high speed static mixer may change upon adjusting the adjustable valves. Similar to the control of pumping flow rates, the closer the high speed static mixer is to the wellbore, the quicker the composition of the mixed fluid entering the wellbore changes.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a high-pressure static mixer 100 according to some aspects. While the present disclosure generally depicts a land-based well system using the high-pressure static mixer 100, similar systems may be operated in subsea well systems. The high-pressure static mixer 100 may be used to combine clean fluid (e.g., water or water with a friction reducer or a surfactant) from a clean fluid system 102 with a stimulation concentrate fluid (e.g., a proppant laden fluid or proppant concentrate) from a proppant fluid system 104.

The clean fluid system 102 may provide the clean fluid to the high-pressure static mixer 100 at clean fluid ports 106. While FIG. 1 depicts the high-pressure static mixer 100 including two clean fluid ports 106, other examples of the high-pressure static mixer 100 may include more or fewer clean fluid ports 106. The clean fluid ports 106 may include controllable valves 108. The controllable valves 108 may be integral with the high-pressure static mixer 100, or the controllable valves 108 may be positioned along clean fluid lines 110 between the clean fluid systems 102 and the clean fluid ports 106. When providing the clean fluid to multiple wells simultaneously, or if positive displacement pumps are not used for pumping the clean fluid, adjusting the controllable valves 108 may adjust the flow rate of the clean fluid entering the high-pressure static mixer 100. When providing the clean fluid to only a single wellhead 125 with the mixed fluid using positive displacement pumps, clean pumps of the clean fluid system 102 may be controlled to adjust the flow rate of the clean fluid provided to the high-pressure static mixer 100. By adjusting the flow rate of the clean fluid, a proppant concentration of the mixed fluid may be adjusted.

The proppant fluid system 104 may provide the stimulation concentrate fluid to the high-pressure static mixer 100 at a proppant concentrate port 112. While FIG. 1 depicts the high-pressure static mixer 100 including a single proppant concentrate port 112, other examples of the high-pressure static mixer 100 may include additional proppant concentrate ports 112 at different locations of the high-pressure static mixer 100. The proppant concentrate port 112 may include a controllable valve 114. The controllable valve 114 may be integral with the high-pressure static mixer 100, or the controllable valve 114 may be positioned along a proppant concentrate line 116 between the proppant fluid system 104 and the proppant concentrate port 112. When providing the simulation concentrate fluid to the multiple wells simultaneously, or if positive displacement pumps are not used for pumping the stimulation concentrate fluid, adjusting the controllable valve 114 may adjust the flow rate of the stimulation concentrate fluid entering the high-pressure static mixer 100. When providing only a single wellhead 125 with the mixed fluid using positive displacement pumps, proppant concentrate pumps of the proppant fluid system 104 may be controlled to adjust the flow rate of the stimulation concentrate fluid provided to the high-pressure static mixer 100. By adjusting the flow rate of the stimulation concentrate fluid, a proppant concentration of the mixed fluid may be adjusted.

By adjusting the controllable valves 108 and 114, or the flow rate of the clean fluid or stimulation concentrate fluid at the clean fluid pump or the proppant concentrate pump, a concentration of proppant in a mixed fluid 118 output by the high-pressure static mixer 100 is adjusted. In an example, a density sensor 120 is positioned at an output port 122 of the high-pressure static mixer 100. The density sensor 120 is able to detect a density of the mixed fluid 118. Using the density of the mixed fluid 118, the concentration of the proppant concentrate in the mixed fluid can be determined. In this manner, the controllable valves 108 and 114, the clean fluid pump of the clean fluid system 102, the proppant concentration pump of the proppant fluid system 104, or any combination thereof may be adjusted when the measured concentration of the proppant concentrate in the mixed fluid differs from a desired proppant concentration range.

Further, because the output port 122 is coupled to a mixed fluid manifold 124, which transmits the mixed fluid to a plurality of wellheads 125a-125d, in close proximity to the plurality of wellbores (e.g., within 100 meters but other distances are also contemplated), the concentration of the proppant concentrate in the mixed fluid entering the wellbores changes quickly after the adjustment of the controllable valves 108 and 114, the clean fluid pump of the clean fluid system 102, the proppant concentration pump of the proppant fluid system 104, or any combination thereof. In another example, the output port 122, which may be referred to as a wellhead connection port, may be directly coupled to a wellhead 125 of a wellbore. In such an example, the concentration of the proppant concentrate in the mixed fluid entering the wellbore may change even quicker than when the mixed fluid is output to the mixed fluid manifold 124.

To avoid wear on the proppant concentrate line 116, the proppant concentrate may be transmitted from the proppant fluid system 104 to the high-pressure static mixer 100 at a relatively low flow rate. For example, the proppant concentrate, which may be a mixture of proppant with a semi-viscous carrier fluid (e.g., 30 lb gel/Mgal of water), may be pumped to the high-pressure static mixer 100 at a flow rate between 10 and 20 barrels per minute. Other flow rates are also contemplated based on the concentration of proppant in the proppant concentrate and any specific stimulation needs of a particular wellbore.

Because the clean fluid provided to the clean fluid ports 106 may not generate wear on the clean fluid lines 110, the clean fluid may be provided to the high-pressure static mixer 100 at much greater flow rates than the proppant concentrate. For example, the clean fluid may be pumped to the high-pressure static mixer 100 at a flow rate between 60 and 80 barrels per minutes. Other flow rates are also contemplated based on the concentration of proppant in the mixed fluid 118 that combines the proppant concentrate and the clean fluid and any specific stimulation needs of a particular wellbore.

The proppant concentrate and the clean fluid may be combined in a mixing region 126 to generate the mixed fluid 118. The mixing region 126 may include a spherical or ovoid shape that encourages mixing of the clean fluid and the proppant concentrate. In another example, the mixing region 126 may include a straight tube with a sufficient length to encourage mixing of the clean fluid and the proppant concentrate. Further, the mixing region 126 may include blades or baffles (not shown) coupled to a wall 128 of the mixing region 126 to further encourage the mixing of the clean fluid and the proppant concentrate without any moving components.

The proppant concentrate port 112 may include a proppant concentrate line connector 130 that mechanically and fluidly couples the high-pressure static mixer 100 to the proppant concentrate line 116. The proppant concentrate line connector 130 may include a threaded region that is able to mate with the proppant concentrate line 116, or the proppant concentrate line connector 130 may be a flanged connection including a gray lock, a clamped flange incorporating a polymer sealing element, or a bolded flange with a metal ring sealing element. Other suitable connection types capable of withstanding pressure, flow rate, and erosive environment of the system are also contemplated. The proppant concentrate may enter the proppant concentrate port 112 at a centralized tube 132 extending from the proppant concentrate line connector 130 to the mixing region 126 of the high-pressure static mixer 100. The clean fluid ports 106 may include clean fluid line connectors 134. The clean fluid line connectors 134 may mechanically and fluidly couple the high-pressure static mixer 100 to the clean fluid lines 110 using a threaded connection or a flanged connection including a gray lock, a clamped flange incorporating a polymer sealing element, or a bolded flange with a metal ring sealing element. Other suitable connection types capable of withstanding pressure, flow rate, and erosive environment of the system are also contemplated. Further, the clean fluid ports 106 may include an annulus 136 between the centralized tube 132 and an inner wall 138 of the high-pressure static mixer 100. In an example, the annulus 136 extends from the clean fluid line connectors 134 to the mixing region 126.

Figure 2:
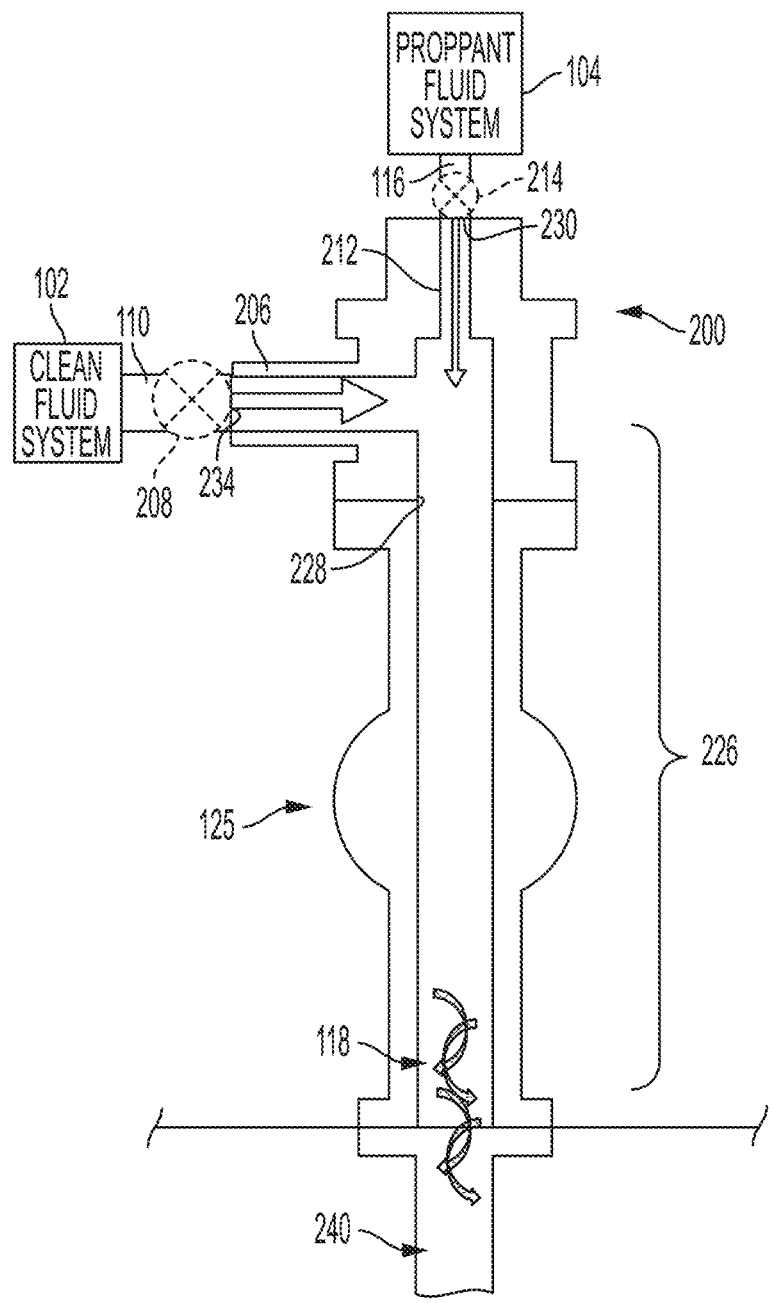
FIG. 2 is a cross-sectional view of an additional example of a high-pressure static mixer coupled to a wellhead according to some aspects of the present disclosure.

FIG. 2 is a cross-sectional view of an additional example of a high-pressure static mixer 200 coupled to the wellhead 125 according to some aspects. The high-pressure static mixer 200 may be coupled directly to the wellhead 125, as opposed to the high-pressure static mixer 100 coupled to the mixed fluid manifold 124 in FIG. 1. In such an arrangement, each wellhead 125 undergoing a stimulation operation may include the high-pressure static mixer 200 coupled directly to the wellhead 125 instead of a fluid supply line connected to the mixed fluid manifold 124. The high-pressure static mixer 200 may be used to combine clean fluid (e.g., water or water with a friction reducer or a surfactant) from the clean fluid system 102 with a stimulation concentrate fluid (e.g., a proppant laden fluid or proppant concentrate) from the proppant fluid system 104.

The clean fluid system 102 may provide the clean fluid to the high-pressure static mixer 200 at a clean fluid port 206. While FIG. 1 depicts the high-pressure static mixer 200 including an individual clean fluid port 206, other examples of the high-pressure static mixer 200 may include more clean fluid ports 206. The clean fluid port 206 may include a controllable valve 208. The controllable valve 208 may be integral with the high-pressure static mixer 200, or the controllable valve 208 may be positioned along the clean fluid lines 110 between the clean fluid system 102 and the clean fluid port 206. Adjusting the controllable valve 208 when a positive displacement pump is not used to pump the clean fluid may adjust the flow rate of the clean fluid entering the high-pressure static mixer 200. Likewise, adjusting the flow rate of the clean fluid pump of the clean fluid system 102 may also adjust the flow rate of the clean fluid entering the high-pressure static mixer 200.

The proppant fluid system 104 may provide the stimulation concentrate fluid to the high-pressure static mixer 200 at a proppant concentrate port 212. While FIG. 2 depicts the high-pressure static mixer 200 including a single proppant concentrate port 212, other examples of the high-pressure static mixer 200 may include additional proppant concentrate ports 212 at different locations of the high-pressure static mixer 200. The proppant concentrate port 212 may include a controllable valve 214. The controllable valve 214 may be integral with the high-pressure static mixer 200, or the controllable valve 214 may be positioned along proppant concentrate line 116 between the proppant fluid system 104 and the proppant concentrate port 212. Adjusting the controllable valve 214 when a positive displacement pump is not used to pump the proppant concentrate may adjust the flow rate of the proppant concentrate entering the high-pressure static mixer 200. Likewise, adjusting the flow rate of a proppant fluid pump of the proppant fluid system 104 may also adjust the flow rate of the proppant concentrate entering the high-pressure static mixer 200.

By adjusting the controllable valves 208 and 214, the clean fluid pump of the clean fluid system 102, the proppant fluid pump of the proppant fluid system 104, or any combination thereof, a concentration of proppant in the mixed fluid 118 output by the high-pressure static mixer 200 is adjusted. In an example, the density sensor 120 described above with respect to FIG. 1 may be positioned to detect a density of the mixed fluid 118. Using the density of the mixed fluid 118, the concentration of the proppant concentrate in the mixed fluid 118 can be determined. In this manner, the controllable valves 208 and 214, the clean fluid pump of the clean fluid system 102, the proppant fluid pump of the proppant fluid system 104, or any combination thereof may be adjusted when the measured concentration of the proppant concentrate in the mixed fluid 118 differs from a desired proppant concentration range. Further, because the high-pressure static mixer 200 is coupled to the wellhead 125, the concentration of the proppant concentrate in the mixed fluid 118 entering a wellbore 240 changes quickly after the adjustment of the controllable valves 208 and 214, the clean fluid pump, or the proppant fluid pump.

To avoid wear on the proppant concentrate line 116, the proppant concentrate may be transmitted from the proppant fluid system 104 to the high-pressure static mixer 200 at a relatively low flow rate. For example, the proppant concentrate, which may be a mixture of proppant with a semi-viscous carrier fluid (e.g., 30 lb gel/Mgal of water), may be pumped to the high-pressure static mixer 200 at a flow rate between 10 and 20 barrels per minute. Other flow rates are also contemplated based on the concentration of proppant in the proppant concentrate and any specific stimulation needs of a particular wellbore.

Because the clean fluid provided to the clean fluid ports 206 may not generate wear on the clean fluid lines 110, the clean fluid may be provided to the high-pressure static mixer 200 at much greater flow rates than the proppant concentrate. For example, the clean fluid may be pumped to the high-pressure static mixer 200 at a flow rate between 60 and 80 barrels per minutes. Other flow rates are also contemplated based on the concentration of proppant in the mixed fluid 118 that includes the proppant concentrate and the clean fluid and any specific stimulation needs of a particular wellbore.

The proppant concentrate and the clean fluid may be combined in a mixing region 226 to generate the mixed fluid 118. The mixing region 226 may include portions of the wellhead 125, which provides a length of tubing in which the clean fluid and the proppant concentrate is able to mix prior to entering the wellbore. The mixing region 226 may include a relatively straight section of tubing, as illustrated in FIG. 2. In another example, the mixing region 226 may include a spherical or ovoid shape that encourages mixing of the clean fluid and the proppant concentrate, as illustrated in FIG. 1. Further, the mixing region 226 may include blades or baffles (not shown) coupled to a wall 228 of the mixing region 226 to further encourage the mixing of the clean fluid and the proppant concentrate without any moving components.

The proppant concentrate port 212 may include a proppant concentrate line connector 230 that mechanically and fluidly couples the high-pressure static mixer 200 to the proppant concentrate line 116. Additionally, the clean fluid port 206 may include a clean fluid line connector 234. The clean fluid line connector 234 may mechanically and fluidly couple the high-pressure static mixer 200 to the clean fluid line 110.

Figure 3:
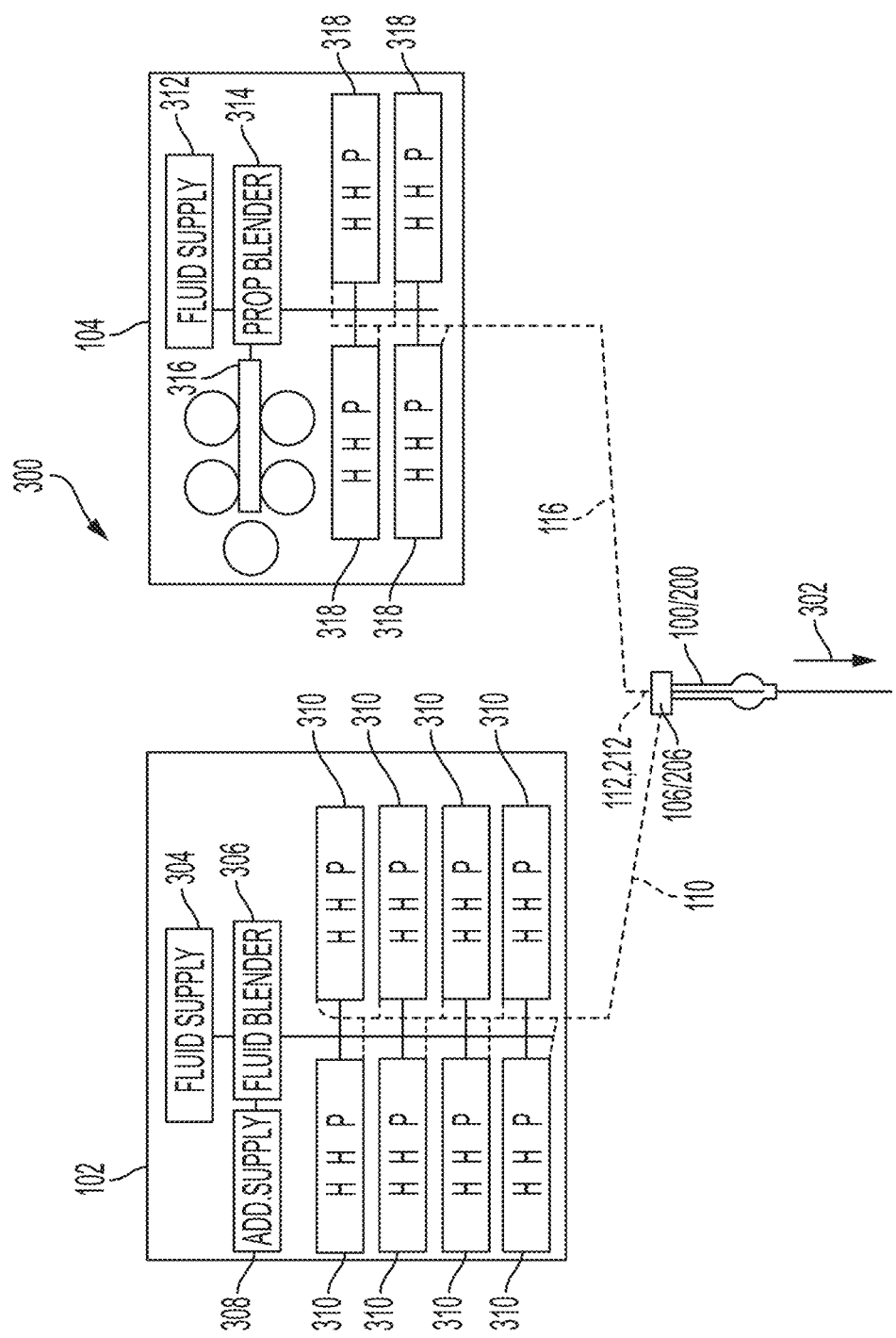
FIG. 3 is a schematic view of the high-pressure static mixer of FIGS. 1 and 2 in a well stimulation environment according to some aspects of the present disclosure.

FIG. 3 is a schematic view of the high-pressure static mixer 100 or 200 in a well stimulation environment 300 according to some aspects. As discussed above with respect to FIGS. 1 and 2, the high-pressure static mixers 100 and 200 receive fluid from the clean fluid system 102 and the proppant fluid system 104. The high-pressure static mixers 100 and 200 mix the clean fluid and the proppant concentrate to output the mixed fluid 118 in a direction 302 toward the wellbore 240. Outputting the mixed fluid 118 in the direction 302 may include outputting the mixed fluid 118 to the mixed fluid manifold 124, as illustrated in FIG. 1, or directly to the wellhead 125, as illustrated in FIG. 2.

The clean fluid system 102 may include a fluid supply 304 that provides water to a fluid blender 306. The fluid blender 306 may blend a friction reducer, a surfactant, or other non-abrasive material from an additive supply 308 with the water from the fluid supply 304. In an example, the fluid blender 306 and the additive supply 308 may not be present in the clean fluid system 102. In such an example, the clean fluid system 102 may pump only the clean fluid from the fluid supply 304 to the high-pressure static mixer 100 or 200.

In either example, the fluid blender 306 or the fluid supply 304 may provide the clean fluid to a plurality of pumps 310. The plurality of pumps 310 output the clean fluid to the clean fluid line 110 at the desired flow rate (e.g., between 60 and 80 barrels per minute). The clean fluid line 110 attaches to the high-pressure static mixer 100 or 200 at the clean fluid port 106 or 206.

The proppant fluid system 104 may include a fluid supply 312 that provides a semi-viscous carrier fluid to a proppant blender 314. The proppant blender 314 may blend proppant, other abrasive material, or any other stimulation additives from a proppant supply 316 with the semi-viscous carrier fluid from the fluid supply 312 to generate the proppant concentrate supplied to the high-pressure static mixer 100 or 200. The proppant blender 314 may provide the proppant concentrate to a plurality of pumps 318. The plurality of pumps 318 output the proppant concentrate to the proppant concentrate line 116 at the desired flow rate (e.g., between 10 and 20 barrels per minute). Because the desired flow rate of the proppant concentrate may be lower than the desired flow rate of the clean fluid, the proppant fluid system 104 may employ a smaller number of pumps in the plurality of pumps 318 than a number of pumps employed in the plurality of pumps 310 of the clean fluid system 102. The proppant concentrate line 116 may attach to the high-pressure static mixer 100 or 200 at the proppant concentrate port 112 or 212.

Figure 4:
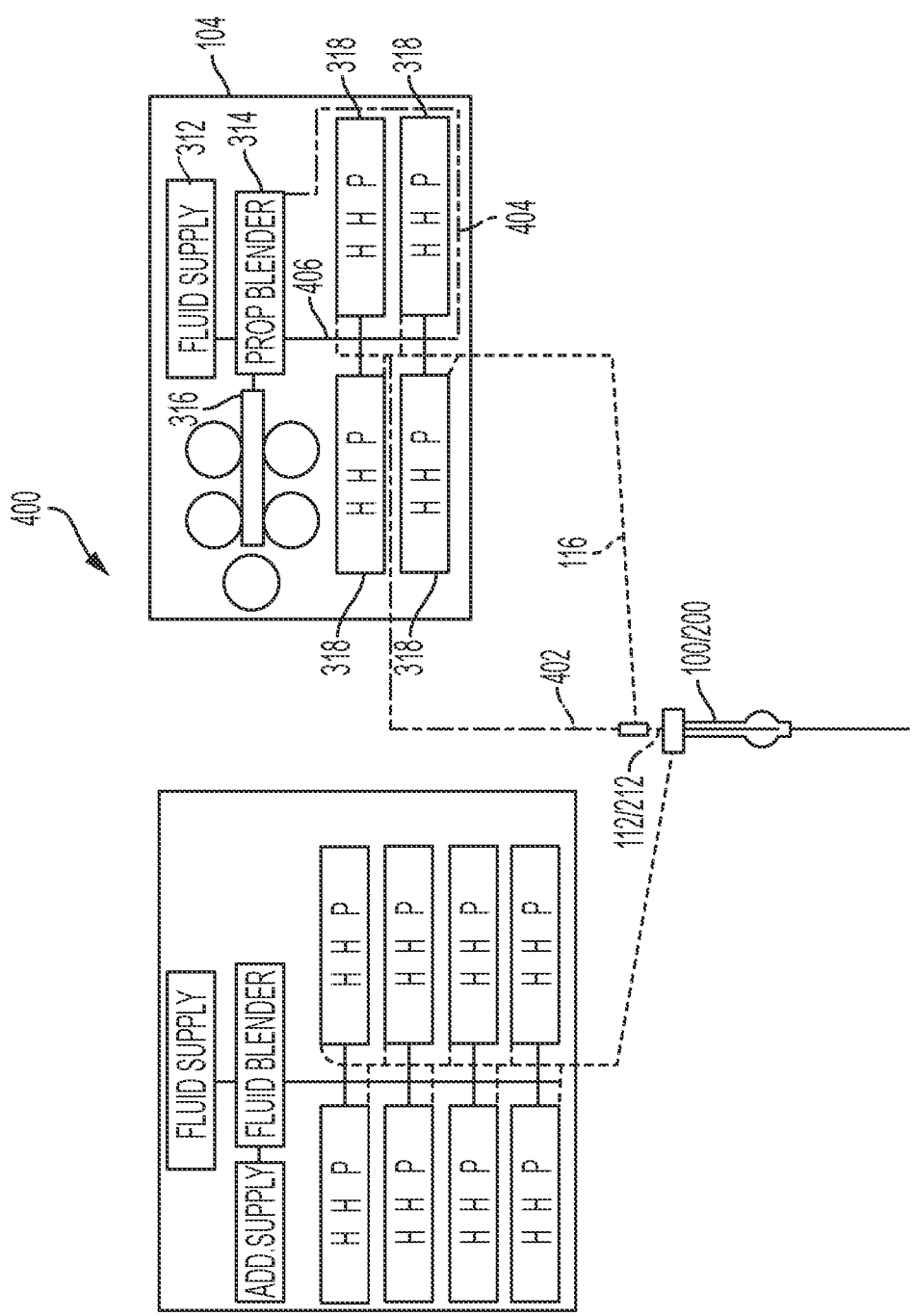
FIG. 4 is a schematic view of an additional example of the high-pressure static mixer of FIGS. 1 and 2 in a well stimulation environment according to some aspects of the present disclosure.

FIG. 4 is a schematic view of an additional example of the high-pressure static mixer 100 or 200 in a well stimulation environment 400 according to some aspects. Because the proppant concentrate line 116 may carry a high concentration of proppant in the proppant concentrate (e.g., 5 pounds per gallon or more) at a flow rate of between 10 and 20 barrels per minute, the proppant concentrate line 116 may employ a high pressure recirculating line 402 and a low pressure recirculating line 404. The high pressure recirculating line 402 and the low pressure recirculating line 404 may prevent the proppant concentrate line 116 from clogging with the proppant suspended in the proppant concentrate.

The high pressure recirculating line 402 may return excess proppant concentrate provided to the high-pressure static mixer 100 or 200 to the proppant concentrate line 116 at or near where the plurality of pumps 318 initially provide the proppant concentrate to the proppant concentrate line 116. In this manner, a buildup of proppant at the proppant concentrate port 112 or 212 is avoided. Likewise, the low pressure recirculating line 404 may return excess proppant concentrate to the proppant blender 314. In this manner, a buildup of proppant in a pump distribution line 406 is avoided.

Figure 5:
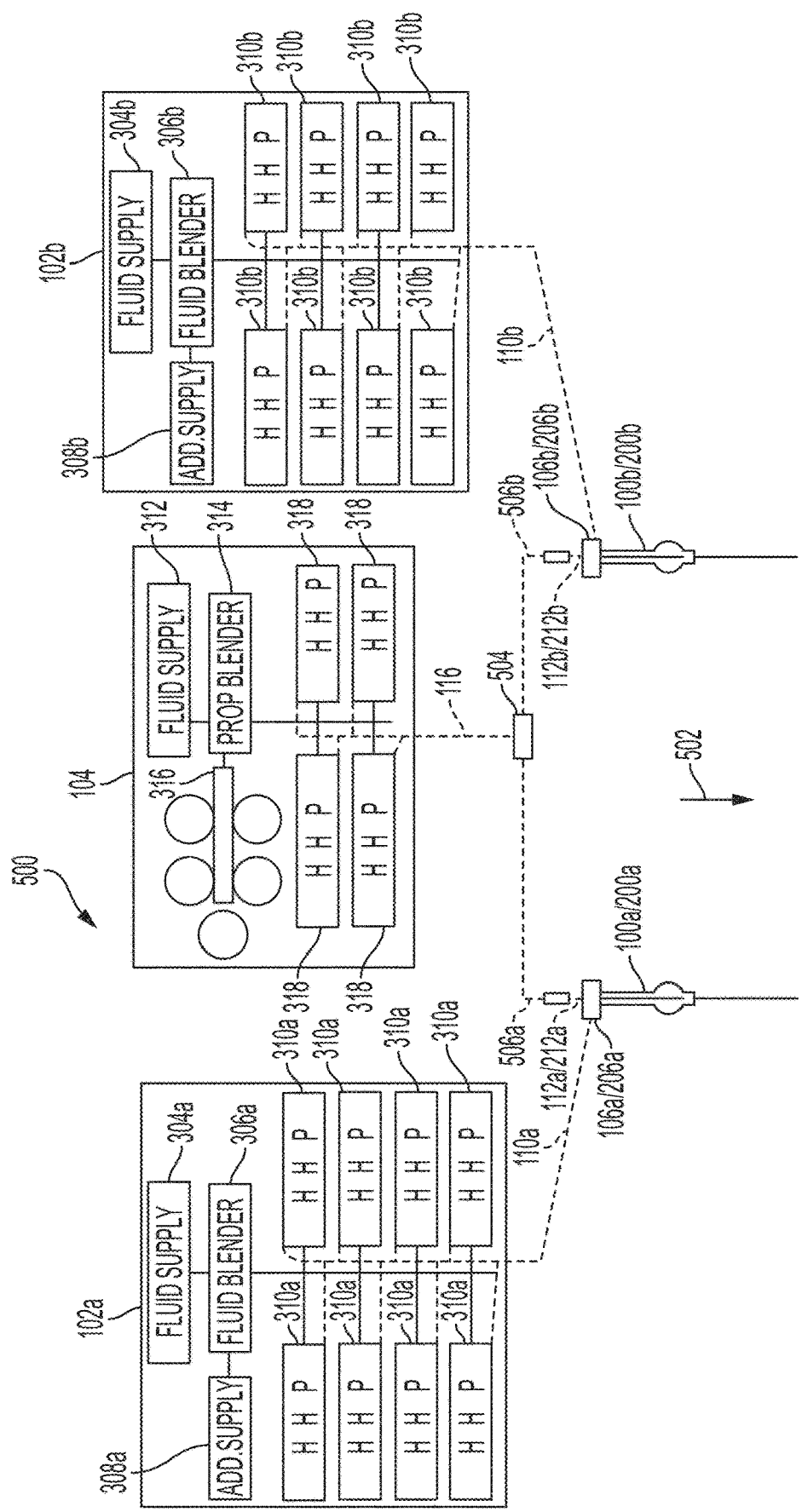
FIG. 5 is a schematic view of two high-pressure static mixers of FIGS. 1 and 2 in a well stimulation environment according to some aspects of the present disclosure.

FIG. 5 is a schematic view of two high-pressure static mixers 100a or 200a and 100b or 200b in a well stimulation environment 500 according to some aspects of the present disclosure. The high-pressure static mixers 100a or 200a and 100b or 200b receive fluid from the clean fluid systems 102a and 102b and the proppant fluid system 104. The high-pressure static mixers 100a or 200a and 100b or 200b mix the clean fluid and the proppant concentrate to output the mixed fluid 118 in a direction 502 toward the wellbores. Outputting the mixed fluid 118 in the direction 502 may include outputting the mixed fluid 118 to mixed fluid manifolds 124, as illustrated in FIG. 1, or directly to the wellheads 125, as illustrated in FIG. 2.

The clean fluid systems 102a and 102b may include fluid supplies 304a and 304b that provide water to fluid blenders 306a and 306b. The fluid blenders 306a and 306b may blend a friction reducer, a surfactant, or other non-abrasive material from additive supplies 308a and 308b with the water from the fluid supplies 304a and 304b. In an example, the fluid blenders 306a and 306b and the additive supplies 308a and 308b may not be present in the clean fluid systems 102a and 102b. In such an example, the clean fluid systems 102a and 102b may pump only the clean fluid from the fluid supplies 304a and 304b to the high-pressure static mixers 100a or 200a and 100b or 200b.

In either example, the fluid blenders 306a and 306b or the fluid supplies 304a and 304b may provide the clean fluid to a plurality of pumps 310a and 310b. The plurality of pumps 310a and 310b output the clean fluid to the clean fluid lines 110a and 110b at the desired flow rate (e.g., between 60 and 80 barrels per minute). The clean fluid line 110 attaches to the high-pressure static mixer 100a or 200a and 100b or 200b at the clean fluid ports 106a or 106b and 106b or 206b.

While the well stimulation environment 500 includes two separate clean fluid systems 102a and 102b for the two separate high-pressure static mixers 100a or 200a and 100b or 200b, the well stimulation environment 500 may include only the individual proppant fluid system 104. The proppant fluid system 104 may include the fluid supply 312 that provides a semi-viscous carrier fluid to the proppant blender 314. The proppant blender 314 may blend proppant, other abrasive material, or any other stimulation additives from the proppant supply 316 with the semi-viscous carrier fluid from the fluid supply 312 to generate the proppant concentrate supplied to the high-pressure static mixers 100a or 200a and 100b or 200b. The proppant blender 314 may provide the proppant concentrate to the plurality of pumps 318. The plurality of pumps 318 output the proppant concentrate to the proppant concentrate line 116 at a desired flow rate suitable to provide sufficient proppant concentrate to the two high-pressure static mixers 100a or 200a and 100b or 200b (e.g., between 20 and 40 barrels per minute).

At a valve 504, the proppant concentrate may be divided into branches 506a and 506b of the proppant concentrate line 116. Because the desired flow rate of the proppant concentrate in the branches 506a and 506b may be lower than the desired flow rate of the clean fluid, the proppant fluid system 104 may employ a smaller number of pumps in the plurality of pumps 318 than a number of pumps employed in the plurality of pumps 310a and 310b of the clean fluid systems 102a and 102b. The proppant concentrate line 116 may attach to the high-pressure static mixers 100a or 200a and 100b or 200b at the proppant concentrate ports 112a or 212a and 112b or 212b.

Further, the valve 504 may be controllable to reduce flow of the proppant concentrate to one or both of the branches 506a and 506b. In an example, the valve 504 may be controllable to stop transmission of the proppant concentrate to one or both of the branches 506a and 506b. Accordingly, each of the high-pressure static mixers 100a or 200a and 100b or 200b may operate with different amounts of proppant concentrate.

While the well stimulation environment 500 describes two high-pressure static mixers 100a or 200a and 100b or 200b supplied with fluid from two clean fluid systems 102a and 102b and one proppant fluid system 104, other arrangements are also contemplated. For example, the well stimulation environment 500 may include two proppant fluid systems 104. In another example, the well stimulation environment 500 may include two proppant fluid systems 104 with only a single clean fluid system 102. Additionally, the well stimulation environment 500 may be scaled to provide fluid to more than the two illustrated high-pressure static mixers 100a or 200a and 100b or 200b.

Figure 6:
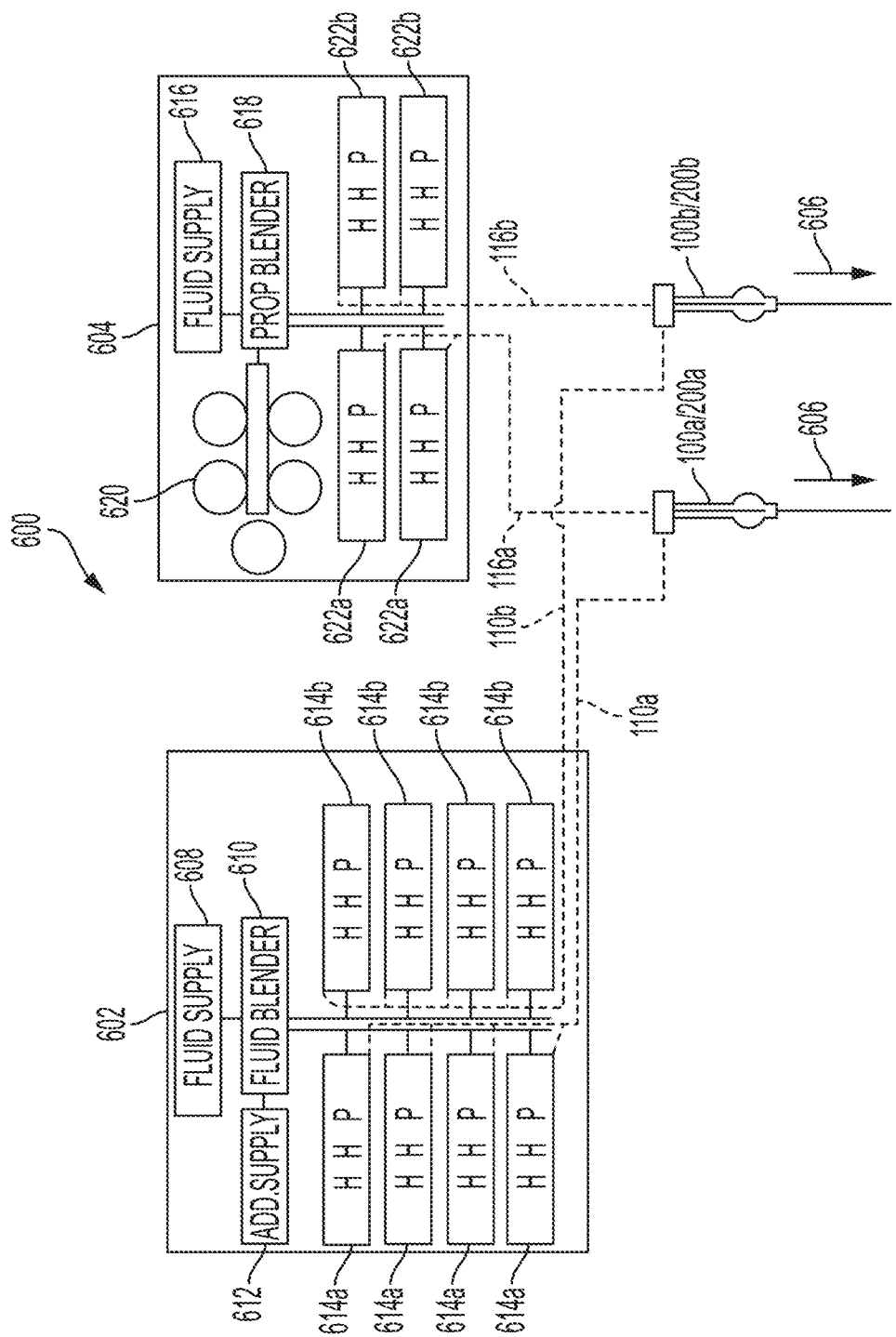
FIG. 6 is a schematic view of an additional example of two high-pressure static mixer of FIGS. 1 and 2 in a well stimulation environment according to some aspects of the present disclosure.

FIG. 6 is a schematic view of high-pressure static mixers 100a or 200a and 100b or 200b in a well stimulation environment 600 according to some aspects. The high-pressure static mixers 100a or 200a and 100b or 200b receive fluid from a clean fluid system 602 and a proppant fluid system 604. The high-pressure static mixers 100a or 200a and 100b or 200b mix the clean fluid and the proppant concentrate to output the mixed fluid 118 in a direction 606 toward the wellbore 240. Outputting the mixed fluid 118 in the direction 606 may include outputting the mixed fluid 118 to the mixed fluid manifold 124, as illustrated in FIG. 1, or directly to the wellhead 125, as illustrated in FIG. 2.

The clean fluid system 602 may include a fluid supply 608 that provides water to a fluid blender 610. The fluid blender 610 may blend a friction reducer, a surfactant, or other non-abrasive material from an additive supply 612 with the water from the fluid supply 608. In an example, the fluid blender 610 and the additive supply 612 may not be present in the clean fluid system 602. In such an example, the clean fluid system 602 may pump only the clean fluid from the fluid supply 608 to the high-pressure static mixers 100a or 200a and 100b or 200b.

In either example, the fluid blender 610 or the fluid supply 608 may provide the clean fluid to a plurality of pumps 614a and 614b. The plurality of pumps 614a and 614b output the clean fluid to the clean fluid lines 110a and 110b at the desired flow rate (e.g., between 60 and 80 barrels per minute). The clean fluid line 110a attaches to the high-pressure static mixer 100a or 200a, and the clean fluid line 110b attaches to the high-pressure static mixer 110b or 200b. Further, the plurality of pumps 614a may be controlled to a different flow rate than the plurality of pumps 614b.

The proppant fluid system 604 may include a fluid supply 616 that provides a semi-viscous carrier fluid to a proppant blender 618. The proppant blender 618 may blend proppant, other abrasive material, or any other stimulation additives from a proppant supply 620 with the semi-viscous carrier fluid from the fluid supply 616 to generate the proppant concentrate supplied to the high-pressure static mixers 100a or 200a and 100b or 200b. The proppant blender 618 may provide the proppant concentrate to a plurality of pumps 622a and 622b. The plurality of pumps 622a output the proppant concentrate to the proppant concentrate line 116a at a desired flow rate (e.g., between 10 and 20 barrels per minute), and the plurality of pumps 622b output the proppant concentrate to the proppant concentrate line 116b at the desired flow rate. Because the desired flow rate of the proppant concentrate may be lower than the desired flow rate of the clean fluid, the proppant fluid system 604 may employ a smaller number of pumps in the plurality of pumps 622a and 622b than a number of pumps employed in the plurality of pumps 614a and 614b of the clean fluid system 102. Further, the plurality of pumps 614a may be controlled to a different flow rate than the plurality of pumps 614b.

While the clean fluid system 602 and the proppant fluid system 604 are described above with respect to FIG. 6 as providing clean fluid and proppant concentrate to two different high-pressure static mixers 100a or 200a and 100b or 200b, the clean fluid system 602 and the proppant fluid system 604 may provide the clean fluid and the proppant concentrate to three or more high-pressure static mixers 100 or 200. In such an example, additional pumps 614 and 622 may be added to the clean fluid system 602 and the proppant fluid system 604, respectively. The additional pumps 614 and 622 may provide the additional clean fluid and proppant concentrate to additional high-pressure static mixers 100 or 200 in a similar manner to the techniques described above with respect to FIG. 6.

Figure 7:
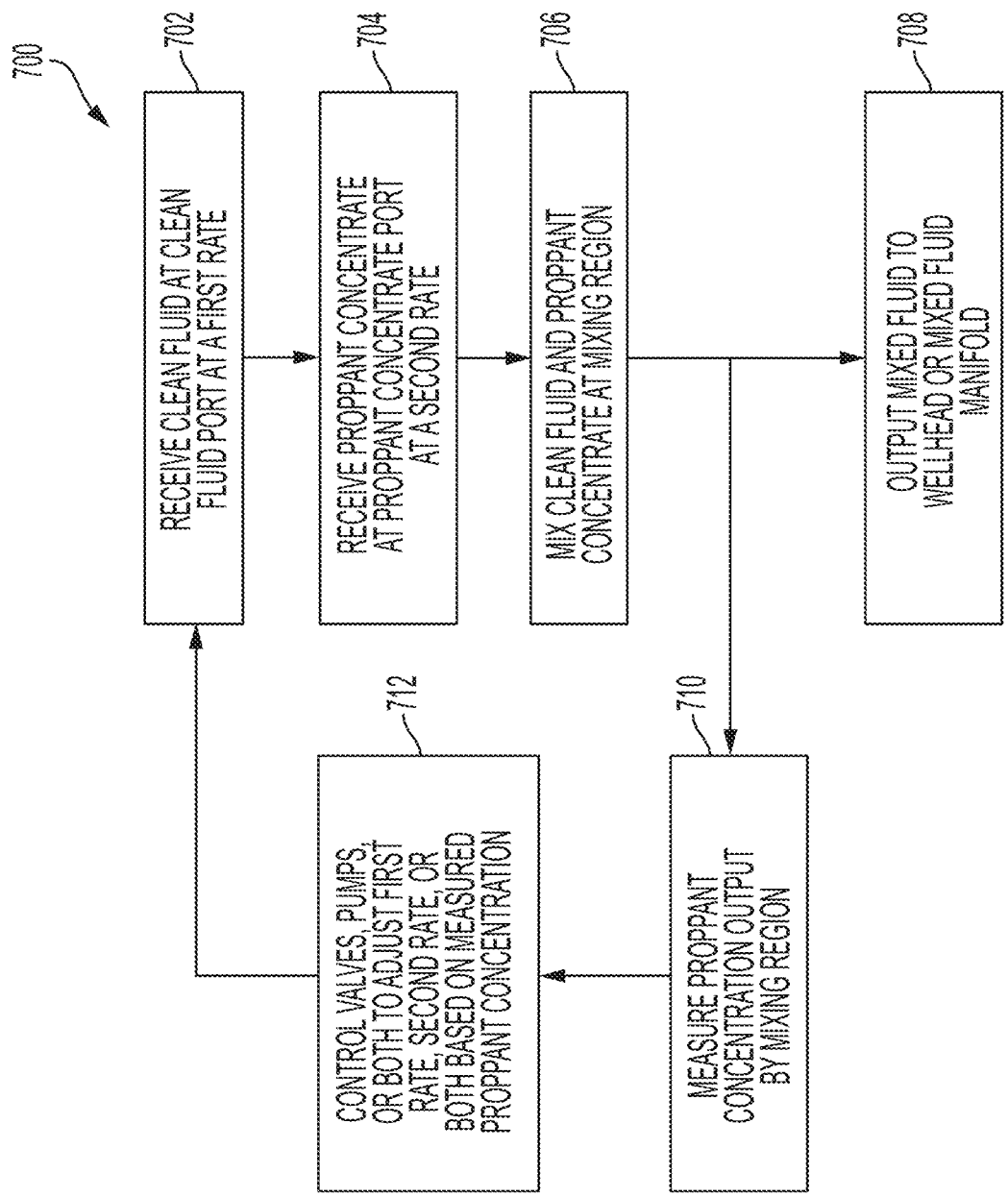
FIG. 7 is a flowchart of a process for controlling proppant concentration of mixed fluid output by the high-pressure static mixers of FIGS. 1 and 2 according to some aspects of the present disclosure.

FIG. 7 is a flowchart of a process 700 for controlling proppant concentration of the mixed fluid 118 output by the high-pressure static mixer 100 or 200 according to some aspects of the present disclosure. At block 702, the process 700 involves receiving clean fluid at the clean fluid port 106 or 206 of the high-pressure static mixer 100 or 200 at a first flow rate. The first flow rate may be between 60 and 80 barrels per minutes. Other flow rates are also contemplated based on needs of the stimulation operation.

At block 704, the process 700 involves receiving proppant concentrate at the proppant concentrate port 112 or 212 of the high-pressure static mixer 100 or 200 at a second flow rate. The second flow rate may be between 10 and 20 barrels per minute. Such a flow rate may be slow enough that abrasive materials within the proppant concentrate produce little wear on the proppant concentrate line 116 while travelling within the proppant concentrate line 116.

At block 706, the process 700 involves mixing the clean fluid with the proppant concentrate at the mixing region 126 or 226 of the high-pressure static mixer 100 or 200. Mixing the clean fluid with the proppant concentrate generates the mixed fluid 118. The mixed fluid 118 is used as a fracturing fluid during the stimulation operation performed on the wellbore 240. Thus, at block 708, the process 700 involves outputting the mixed fluid 118 directly to the wellhead 125 or to multiple wellheads 125 using the mixed fluid manifold 124.

At block 710, the process 700 involves measuring a proppant concentration of the mixed fluid 118 that is output from the mixing region 126 to the wellhead 125 or the mixed fluid manifold 124. The proppant concentration may be measured using the density sensor 120, as described above with respect to FIG. 1, or using any other measurement device capable of detecting a concentration of the proppant in the mixed fluid 118. The measured proppant concentration of the mixed fluid 118 may be compared to a proppant concentration range desired for a wellbore stimulation operation to determine if any adjustments to the mixed fluid 118 would be beneficial.

At block 712, the process 700 involves controlling the controllable valves 108 and 114, the pumps 310 of the clean fluid supply 102, the pumps 318 of the proppant fluid supply 104, or a combination thereof to adjust the first rate of the clean fluid, the second rate of the proppant concentrate, or both based on the measured proppant concentration of the mixed fluid 118. By adjusting the flow rates of the clean fluid and the proppant concentrate, the proppant concentration may be increased or decreased depending on the desired proppant concentration range. Upon adjusting the flow rates of the clean fluid and the proppant concentrate, the clean fluid is received at block 702 at a new first rate, and the proppant concentrate is received at block 704 at a new second rate.

In some aspects, systems, devices, and methods for mixing stimulation fluids using a high-pressure static mixer are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system, comprising: a first high-pressure static mixer; a clean fluid system positionable to provide clean fluid to the first high-pressure static mixer at a first fluid velocity; a proppant fluid system positionable to provide a proppant concentrate to the first high-pressure static mixer at a second fluid velocity; and a first wellhead in fluid communication with the first high-pressure static mixer and positionable to receive a mixed fluid comprising the clean fluid and the proppant concentrate from the first high-pressure static mixer.

Example 2 is the system of example 1, further comprising: a second wellhead in fluid communication with the first high-pressure static mixer and positionable to receive the mixed fluid from the first high-pressure static mixer.

Example 3 is the system of example 2, further comprising: a mixed fluid manifold in fluid communication with the first high-pressure static mixer, wherein the mixed fluid manifold is positionable to provide the mixed fluid to the first wellhead and the second wellhead.

Example 4 is the system of examples 1-3, further comprising: a second high-pressure static mixer positionable to receive the clean fluid from the clean fluid system at the first fluid velocity and to receive the proppant concentrate from the proppant fluid system at the second fluid velocity; and a second wellhead in fluid communication with the second high-pressure static mixer and positionable to receive the mixed fluid comprising the clean fluid and the proppant concentrate from the second high-pressure static mixer.

Example 5 is the system of example 4, wherein the first high-pressure static mixer is mechanically attached to the first wellhead, and the second high-pressure static mixer is mechanically attached to the second wellhead.

Example 6 is the system of examples 1-5, wherein the first high-pressure static mixer comprises: a clean fluid port positionable to receive the clean fluid from the clean fluid system; a proppant concentrate port positionable to receive the proppant concentrate from the proppant fluid system; and a mixing region positionable to mix the clean fluid with the proppant concentrate to produce the mixed fluid and to output the mixed fluid a third fluid velocity different from the first fluid velocity and the second fluid velocity.

Example 7 is the system of examples 1-6, further comprising: a second high-pressure static mixer positionable to receive the clean fluid from the clean fluid system at a third fluid velocity different from the first fluid velocity and positionable to receive the proppant concentrate from the proppant fluid system at a fourth fluid velocity different from the second fluid velocity; and a second wellhead in fluid communication with the second high-pressure static mixer and positionable to receive an additional mixed fluid comprising the clean fluid and the proppant concentrate from the second high-pressure static mixer.

Example 8 is the system of examples 1-7, further comprising: a density sensor positionable to measure a proppant concentration of the mixed fluid at an output of the first high-pressure static mixer, wherein flow of the clean fluid from the clean fluid system and the proppant concentrate from the proppant fluid system are controllable using proppant concentration measurements measured by the density sensor.

Example 9 is the system of examples 1-8, further comprising a first controllable valve positioned between the clean fluid system and the first high-pressure static mixer and a second controllable valve positioned between the proppant fluid system and the first high-pressure static mixer, wherein the first controllable valve and the second controllable valve are adjustable to control a proppant concentration of the mixed fluid.

Example 10 is a high-pressure static mixer, comprising: a clean fluid port positionable to receive clean fluid from a clean fluid system at a first fluid velocity; a proppant concentrate port positionable to receive a proppant concentrate from a proppant fluid system at a second fluid velocity that is less than the first fluid velocity; and a mixing region positionable to mix the clean fluid with the proppant concentrate to produce a mixed fluid and to output the mixed fluid at a third fluid velocity.

Example 11 is the high-pressure static mixer of example 10, further comprising: a first controllable valve positioned at the clean fluid port; and a second controllable valve positioned at the proppant concentrate port, wherein the first controllable valve and the second controllable valve are adjustable to control a proppant concentration of the mixed fluid.

Example 12 is the high-pressure static mixer of examples 10-11, further comprising: a density sensor positionable to measure a proppant concentration of the mixed fluid at an output of the mixing region.

Example 13 is the high-pressure static mixer of examples 10-12, wherein the mixing region comprises blades or baffles positionable to encourage mixing of the clean fluid and the proppant concentrate.

Example 14 is the high-pressure static mixer of examples 10-13, wherein the proppant concentrate port comprises: a proppant concentrate line connector; and a centralized tube extending from the proppant concentrate line connector to the mixing region; and wherein the clean fluid port comprises: a clean fluid line connector; and an annulus between the centralized tube and an inner wall of the high-pressure static mixer, wherein the annulus extends from the clean fluid line connector to the mixing region.

Example 15 is the high-pressure static mixer of examples 10-14, wherein the mixing region further comprises: a wellhead connection port positionable to couple directly to a wellhead to output the mixed fluid to the wellhead.

Example 16 is the high-pressure static mixer of examples 10-15, further comprising: an additional clean fluid port positionable to receive the clean fluid from the clean fluid system at the first velocity.

Example 17 is a method, comprising: receiving clean fluid at a first flow rate at a clean fluid port of a high-pressure static mixer; receiving proppant concentrate at a second flow rate less than the first flow rate at a proppant concentration port of the high-pressure static mixer; mixing clean fluid and proppant concentrate at a mixing region of the high-pressure static mixer to generate a mixed fluid; and outputting the mixed fluid from the mixing region to a wellhead or a mixed fluid manifold.

Example 18 is the method of example 17, further comprising: measuring a proppant concentration of the mixed fluid at an output of the mixing region; and controlling a clean fluid valve, a proppant concentrate valve, a flow rate of a clean fluid pump, a flow rate of a proppant concentrate pump, or a combination thereof to adjust the first flow rate, the second flow rate, or both to change the proppant concentration of the mixed fluid when the proppant concentration differs from a proppant concentration range.

Example 19 is the method of examples 17-18, wherein outputting the mixed fluid from the mixing region comprises outputting the mixed fluid at a third flow rate that is different from the first flow rate and the second flow rate.

Example 20 is the method of example(s) 17, wherein the mixed fluid is output to the mixed fluid manifold that is fluidly coupled to a plurality of wellheads.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
a first high-pressure static mixer;
a clean fluid system positionable to provide clean fluid to the first high-pressure static mixer at a first fluid velocity and at a first pressure, wherein the clean fluid system comprises:
a fluid blender; and
a first pump positionable to receive the clean fluid from the fluid blender and to output the clean fluid to the first high-pressure static mixer;
a proppant fluid system positionable to provide a proppant concentrate to the first high-pressure static mixer at a second fluid velocity and at a second pressure, wherein the first fluid velocity is higher than the second fluid velocity and the first pressure is lower than the second pressure, wherein the proppant fluid system comprises:
a proppant blender for blending a proppant with a carrier fluid to generate the proppant concentrate; and
a second pump positionable to receive the proppant concentrate from the proppant blender and to output the proppant concentrate to the first high-pressure static mixer; and
a first wellhead in fluid communication with the first high-pressure static mixer and positionable to receive a mixed fluid comprising the clean fluid and the proppant concentrate from the first high-pressure static mixer.

2. The system of claim 1, further comprising:
a second wellhead in fluid communication with the first high-pressure static mixer and positionable to receive the mixed fluid from the first high-pressure static mixer.

3. The system of claim 2, further comprising:
a mixed fluid manifold in fluid communication with the first high-pressure static mixer, wherein the mixed fluid manifold is positionable to provide the mixed fluid to the first wellhead and the second wellhead.

4. The system of claim 1, further comprising:
a second high-pressure static mixer positionable to receive the clean fluid from the clean fluid system at the first fluid velocity and to receive the proppant concentrate from the proppant fluid system at the second fluid velocity; and
a second wellhead in fluid communication with the second high-pressure static mixer and positionable to receive the mixed fluid comprising the clean fluid and the proppant concentrate from the second high-pressure static mixer.

5. The system of claim 4, wherein the first high-pressure static mixer is mechanically attached to the first wellhead, and the second high-pressure static mixer is mechanically attached to the second wellhead.

6. The system of claim 1, wherein the first high-pressure static mixer comprises:
a clean fluid port positionable to receive the clean fluid from the clean fluid system;
a proppant concentrate port positionable to receive the proppant concentrate from the proppant fluid system; and
a mixing region positionable to mix the clean fluid with the proppant concentrate to produce the mixed fluid and to output the mixed fluid a third fluid velocity different from the first fluid velocity and the second fluid velocity.

7. The system of claim 1, further comprising:
a second high-pressure static mixer positionable to receive the clean fluid from the clean fluid system at a third fluid velocity different from the first fluid velocity and positionable to receive the proppant concentrate from the proppant fluid system at a fourth fluid velocity different from the second fluid velocity; and
a second wellhead in fluid communication with the second high-pressure static mixer and positionable to receive an additional mixed fluid comprising the clean fluid and the proppant concentrate from the second high-pressure static mixer.

8. The system of claim 1, further comprising:
a density sensor positionable to measure a proppant concentration of the mixed fluid at an output of the first high-pressure static mixer, wherein flow of the clean fluid from the clean fluid system and the proppant concentrate from the proppant fluid system are controllable using proppant concentration measurements measured by the density sensor.

9. The system of claim 1, further comprising a first controllable valve positioned between the clean fluid system and the first high-pressure static mixer and a second controllable valve positioned between the proppant fluid system and the first high-pressure static mixer, wherein the first controllable valve and the second controllable valve are adjustable to control a proppant concentration of the mixed fluid.

10. A high-pressure static mixer, comprising:
a clean fluid port positionable to receive clean fluid from a clean fluid system at a first fluid velocity and at a first pressure, the clean fluid system comprising:
   a fluid blender; and
   a first pump positionable to receive the clean fluid from the fluid blender and to output the clean fluid to the clean fluid port;
a proppant concentrate port positionable to receive a proppant concentrate from a proppant fluid system at a second fluid velocity that is less than the first fluid velocity and at a second pressure that is higher than the first pressure, the proppant fluid system comprising:
   a proppant blender for blending a proppant with a carrier fluid to generate the proppant concentrate; and
   a second pump positionable to receive the proppant concentrate from the proppant blender and to output the proppant concentrate to the proppant concentrate port; and
a mixing region positionable to mix the clean fluid with the proppant concentrate to produce a mixed fluid and to output the mixed fluid at a third fluid velocity.

11. The high-pressure static mixer of claim 10, further comprising:
a first controllable valve positioned at the clean fluid port; and
a second controllable valve positioned at the proppant concentrate port, wherein the first controllable valve and the second controllable valve are adjustable to control a proppant concentration of the mixed fluid.

12. The high-pressure static mixer of claim 10, further comprising:
a density sensor positionable to measure a proppant concentration of the mixed fluid at an output of the mixing region.

13. The high-pressure static mixer of claim 10, wherein the mixing region comprises blades or baffles positionable to encourage mixing of the clean fluid and the proppant concentrate.

14. The high-pressure static mixer of claim 10, wherein the proppant concentrate port comprises:
a proppant concentrate line connector; and
a centralized tube extending from the proppant concentrate line connector to the mixing region; and
wherein the clean fluid port comprises:
   a clean fluid line connector; and
   an annulus between the centralized tube and an inner wall of the high-pressure static mixer, wherein the annulus extends from the clean fluid line connector to the mixing region.

15. The high-pressure static mixer of claim 10, wherein the mixing region further comprises:
a wellhead connection port positionable to couple directly to a wellhead to output the mixed fluid to the wellhead.

16. The high-pressure static mixer of claim 10, further comprising:
an additional clean fluid port positionable to receive the clean fluid from the clean fluid system at the first fluid velocity.

17. A method, comprising:
receiving clean fluid at a first flow rate and at a first pressure at a clean fluid port of a high-pressure static mixer from a clean fluid system, the clean fluid system including a fluid blender and a first pump positionable to receive the clean fluid from the fluid blender and to output the clean fluid to the clean fluid port;
receiving proppant concentrate at a second flow rate less than the first flow rate and at a second pressure less than the first pressure at a proppant concentration port of the high-pressure static mixer from a proppant fluid system, the proppant fluid system including a proppant blender for blending a proppant with a carrier fluid to generate the proppant concentrate and a second pump positionable to receive the proppant concentrate from the proppant blender and to output the proppant concentrate to the proppant concentration port;
mixing clean fluid and proppant concentrate at a mixing region of the high-pressure static mixer to generate a mixed fluid; and
outputting the mixed fluid from the mixing region to a wellhead or a mixed fluid manifold.

18. The method of claim 17, further comprising:
measuring a proppant concentration of the mixed fluid at an output of the mixing region; and
controlling a clean fluid valve, a proppant concentrate valve, a flow rate of a clean fluid pump, a flow rate of a proppant concentrate pump, or a combination thereof to adjust the first flow rate, the second flow rate, or both to change the proppant concentration of the mixed fluid when the proppant concentration differs from a proppant concentration range.

19. The method of claim 17, wherein outputting the mixed fluid from the mixing region comprises outputting the mixed fluid at a third flow rate that is different from the first flow rate and the second flow rate.

20. The method of claim 17, wherein the mixed fluid is output to the mixed fluid manifold that is fluidly coupled to a plurality of wellheads.

* * * * *